(12) United States Patent
Okamura et al.

(10) Patent No.: US 8,016,932 B2
(45) Date of Patent: Sep. 13, 2011

(54) AQUEOUS INK, INK SET, IMAGE FORMING METHOD AND IMAGE FORMING APPARATUS

(75) Inventors: Daiji Okamura, Yokohama (JP); Hiroyuki Takuhara, Yaita (JP); Yuuki Nishino, Tokyo (JP); Mikio Sanada, Kawasaki (JP); Kenji Moribe, Fujisawa (JP); Satoshi Kudo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 591 days.

(21) Appl. No.: 12/115,033

(22) Filed: May 5, 2008

(65) Prior Publication Data

US 2008/0280044 A1 Nov. 13, 2008

(30) Foreign Application Priority Data

May 11, 2007 (JP) .................................. 2007-126629
Apr. 23, 2008 (JP) .................................. 2008-112755

(51) Int. Cl.
*C09D 11/02* (2006.01)
(52) U.S. Cl. ..................................... 106/31.89; 106/31.6
(58) Field of Classification Search .................. 106/31.6, 106/31.89
See application file for complete search history.

(56) References Cited

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 5,451,251 A | 9/1995 | Mafune et al. | 106/22 H |
| 5,571,313 A | 11/1996 | Mafune et al. | 106/22 H |
| 5,609,671 A | 3/1997 | Nagasawa | 106/20 R |
| 5,911,815 A | 6/1999 | Yamamoto et al. | 106/31.27 |
| 5,976,230 A | 11/1999 | Askeland et al. | 106/31.27 |
| 6,027,210 A | 2/2000 | Kurabayashi et al. | 347/100 |
| 6,062,674 A | 5/2000 | Inui et al. | 347/43 |
| 6,174,354 B1 | 1/2001 | Takizawa et al. | 106/31.43 |
| 6,221,141 B1 | 4/2001 | Takada et al. | 106/31.6 |
| 6,280,513 B1 | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,425,662 B1 | 7/2002 | Teraoka et al. | 347/100 |
| 6,506,239 B1 | 1/2003 | Osumi et al. | 106/31.27 |
| 6,511,534 B1 | 1/2003 | Mishina et al. | 106/31.33 |
| 6,540,329 B1 | 4/2003 | Kaneko et al. | 347/43 |

(Continued)

FOREIGN PATENT DOCUMENTS

CN 1366007 A 8/2002

(Continued)

OTHER PUBLICATIONS

Jun. 2, 2010 Chinese Official Action in Chinese Patent Application No. 200810097367.4.

(Continued)

*Primary Examiner* — Jerry A Lorengo
*Assistant Examiner* — Veronica F Faison
(74) *Attorney, Agent, or Firm* — Fitzpatrick, Cella, Harper & Scinto

(57) ABSTRACT

An aqueous ink used together with a black ink containing a self-dispersion pigment, wherein the aqueous ink contains a reactive component for destabilizing the dispersion state of the self-dispersion pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

8 Claims, 2 Drawing Sheets

U.S. PATENT DOCUMENTS

| | | | |
|---|---|---|---|
| 6,706,104 B2 | 3/2004 | Takuhara et al. | 106/31.6 |
| 6,706,105 B2 | 3/2004 | Watanabe et al. | 106/31.6 |
| 6,780,901 B1 | 8/2004 | Endo et al. | 523/160 |
| 6,802,893 B1 * | 10/2004 | Komatsu et al. | 106/31.6 |
| 7,005,461 B2 | 2/2006 | Sanada et al. | 523/160 |
| 7,025,817 B2 | 4/2006 | Kanke et al. | 106/31.51 |
| 7,144,452 B2 | 12/2006 | Takayama et al. | 106/31.52 |
| 7,160,372 B2 | 1/2007 | Yoshizawa et al. | 106/31.47 |
| 7,160,376 B2 | 1/2007 | Watanabe et al. | 106/31.6 |
| 7,198,664 B2 | 4/2007 | Mafune et al. | 106/31.28 |
| 7,198,665 B2 | 4/2007 | Nakamura et al. | 106/31.52 |
| 7,201,791 B2 | 4/2007 | Okamura et al. | 106/31.47 |
| 7,208,033 B2 | 4/2007 | Kawabe et al. | 106/31.48 |
| 7,229,166 B2 | 6/2007 | Tomioka et al. | 347/100 |
| 7,244,299 B2 | 7/2007 | Tsuji et al. | 106/31.48 |
| 7,247,194 B2 | 7/2007 | Okamura et al. | 106/31.47 |
| 7,247,196 B2 | 7/2007 | Sato et al. | 106/31.52 |
| 7,270,701 B2 | 9/2007 | Jinnou et al. | 106/31.47 |
| 7,276,110 B2 | 10/2007 | Tsujimura et al. | 106/31.27 |
| 7,276,112 B2 | 10/2007 | Tokuda et al. | 106/31.6 |
| 7,297,197 B2 | 11/2007 | Jinnou et al. | 106/31.47 |
| 7,347,890 B2 | 3/2008 | Nito et al. | 106/31.27 |
| 7,371,274 B2 | 5/2008 | Sanada et al. | 106/31.27 |
| 7,402,200 B2 | 7/2008 | Imai et al. | 106/31.27 |
| 2002/0041316 A1 | 4/2002 | Katsuragi et al. | 347/96 |
| 2002/0093557 A1 | 7/2002 | Takuhara et al. | |
| 2004/0201658 A1 | 10/2004 | Jackson et al. | 347/100 |
| 2004/0257418 A1 | 12/2004 | Doi | 347/100 |
| 2005/0117008 A1 | 6/2005 | Konishi | |
| 2005/0206702 A1 | 9/2005 | Yamashita et al. | 347/100 |
| 2006/0023042 A1 | 2/2006 | Doi | 347/100 |
| 2006/0066699 A1 | 3/2006 | Tokuda et al. | 347/100 |
| 2006/0089424 A1 | 4/2006 | Sanada et al. | 523/160 |
| 2006/0092251 A1 | 5/2006 | Prasad et al. | 347/100 |
| 2006/0098068 A1 | 5/2006 | Hakamada et al. | 347/100 |
| 2006/0103704 A1 | 5/2006 | Hakamada et al. | 347/100 |
| 2006/0135647 A1 | 6/2006 | Ichinose et al. | 523/160 |
| 2006/0197814 A1 * | 9/2006 | Doi | 347/100 |
| 2006/0203055 A1 | 9/2006 | Doi | 347/96 |
| 2006/0293410 A1 | 12/2006 | Tokita et al. | 523/160 |
| 2007/0097155 A1 | 5/2007 | Imai et al. | 347/1 |
| 2007/0097156 A1 | 5/2007 | Udagawa et al. | 347/1 |
| 2007/0112095 A1 | 5/2007 | Moribe et al. | 523/160 |
| 2007/0252868 A1 | 11/2007 | Sanada et al. | 347/33 |
| 2007/0252881 A1 | 11/2007 | Sanada et al. | 347/100 |
| 2008/0007606 A1 | 1/2008 | Yanagimachi et al. | 347/100 |
| 2008/0018722 A1 | 1/2008 | Mafune et al. | 347/100 |
| 2008/0106581 A1 | 5/2008 | Sanada et al. | 347/86 |
| 2008/0136862 A1 | 6/2008 | Kawabe et al. | 347/29 |

FOREIGN PATENT DOCUMENTS

| | | |
|---|---|---|
| CN | 1659245 A | 8/2005 |
| EP | 1 085 062 A2 | 3/2001 |
| EP | 1 125 994 A1 | 8/2001 |
| EP | 1 188 804 A1 | 3/2002 |
| JP | 63-152681 | 6/1988 |
| JP | 64-006074 | 1/1989 |
| JP | 8-003498 | 1/1996 |
| JP | 11-343441 | 12/1999 |
| JP | 2001-150793 | 6/2001 |
| JP | 2001-152059 | 6/2001 |

OTHER PUBLICATIONS

Aug. 12, 2008 European Search Report in European Patent Appln. No. 08155980.9.

* cited by examiner

AQUEOUS INK, INK SET, IMAGE FORMING METHOD AND IMAGE FORMING APPARATUS

BACKGROUND OF THE INVENTION

1. Field of the Invention

The present invention relates to an aqueous ink particularly suitable for use in an ink jet recording method, and an ink set, an image forming method and an image forming apparatus using such an aqueous ink.

2. Description of the Related Art

An ink jet recording method is widely used in various fields because of the features that recording can be conducted with a low noise, and high-resolution images can be obtained at high speed by using a recording head having a high-density multi-orifice.

Inks (pigment inks) containing a pigment as a coloring material capable of obtaining recorded articles high in image density and excellent in fastness properties have heretofore been used as inks used in the ink jet recording method. With respect to the pigment inks, black inks containing carbon black and a dispersant and black inks containing a self-dispersion pigment capable of dispersing the pigment without using a dispersant have been proposed (see Japanese Patent Application Laid-Open Nos. S63-152681, S64-006074 and H08-003498).

In recent years, full-color recorded articles have been generally used as various kinds of report materials and notice materials in offices, schools and stores. Therefore, the ink jet recording method is required to form not only a high-quality black image, but also a high-quality full-color image. Upon the formation of such a full-color image, a wide variety of so-called plain papers such as paper for copying, paper for reporting, notepaper, letter paper, bond paper and continuous business forms are used. From the viewpoints of environmental protection and resource protection in recent years, plain paper containing a recycled material has been widely used as a recording medium. Even when a wide variety of plain papers are used as the recording medium, thus, investigations are carried out from various points of view such as compositions and physical properties of inks for forming high-quality images.

In the ink jet recording method, it is widely conducted to use, as a black ink, such a pigment ink as described above in combination with other inks, particularly color inks to form a full-color image. Specific examples of such color inks include at least one selected from a magenta ink, a cyan ink, a yellow ink, a red ink, a green ink and a blue ink. At this time, for a general ink set, it is conducted to adjust the properties of the respective inks as follows. More specifically, with respect to the color inks, it is conducted to make the permeability of the color inks into a recording medium relatively high for the purpose of improving the fixing ability of the inks and inhibiting the occurrence of bleeding at a boundary between images formed with a plurality of color inks. With respect to the black ink, it is conducted to set the permeability of the black ink into the recording medium relatively low compared with the color inks for the purpose of improving character quality. In other words, it is conducted to make the surface tension of the black ink and the surface tension of each color ink relatively high and relatively low, respectively. When an ink set having such black ink and color inks is used to form images, the following problem may be caused in some cases. Namely, a phenomenon (bleeding) that bleeding occurs at a boundary portion between an image formed with the black ink and an image formed with the color ink or a phenomenon that the black ink is unevenly mixed with the color ink to lower image quality may be caused in some cases. In order to inhibit the occurrence of this bleeding, there has been proposed a recording method in which a first ink and a second ink which reacts with the first ink are used and the second ink is applied so as to overlap a region to which the first ink is applied (see Japanese Patent Application Laid-Open No. H11-343441).

In the case where a color ink and a black ink containing a pigment are applied so as to overlap each other for the purpose of inhibiting the occurrence of bleeding, color unevenness in which the image density or color tone of the resulting image varies may occur in some cases according to the order of application of the color ink and the black ink. In order to inhibit the occurrence of this color unevenness, proposals have been made as to such an ink set that a black ink contains a pigment and a salt, and a color ink contains a component for destabilizing the dispersion state of a pigment in the black ink, and to an image forming method (see Japanese Patent Application Laid-Open Nos. 2001-150793 and 2001-152059).

In recent years, for achieving far excellent image quality in the ink jet recording method, it has been conducted to bi-directionally scan a recording head in a main scanning direction 2 times or more, thereby recording an image having the same width as the length of the recording head (hereinafter referred to as "multi-pass recording"). When the multi-pass recording is conducted, the recording time may not be sufficiently shortened in some cases even when the number of nozzles from which one kind of ink is ejected is increased, or when the width along which a plurality of ejection orifices ejecting one kind of ink is arranged is increased. Thus, in order to shorten the recording time, it is attempted to conduct recording in both directions of a forward direction and a backward direction of a main scan of the recording head (hereinafter referred to as "bi-directional recording"), or to record an image of a unit region by one main scan of the recording head (hereinafter referred to as "one-pass recording"). Recording is conducted by combining the one-pass recording with the bi-directional recording, i.e., one-pass bi-directional recording is conducted, whereby there is no need to scan one unit region on a recording medium plural times, so that the recording time can be greatly shortened.

However, as a result of an investigation by the present inventors, it has been found that when recording is conducted at high speed like the one-pass bi-directional recording, such a problem as described below is caused. Such a problem that bleeding is markedly caused has been found. And besides, such a problem that color unevenness is markedly caused when a black ink and a color ink which reacts with the black ink are applied so as to overlap each other like the inventions described in Japanese Patent Application Laid-Open Nos. 2001-150793 and 2001-152059 for the purpose of inhibiting the occurrence of bleeding has been found. This color unevenness is particularly conspicuous in such an image that an image region where recording is conducted in such a manner that a color ink having reactivity overlaps a black ink and an image region where recording is conducted in such a manner that the black ink overlaps the color ink having reactivity coexist. In short, the inventions described in Japanese Patent Application Laid-Open Nos. 2001-150793 and 2001-152059 are insufficient as a method of forming a high-quality image of a high level required in recent years when a wide variety of plain papers are used as recording media.

SUMMARY OF THE INVENTION

Accordingly, it is an object of the present invention to provide an aqueous ink that can provide images inhibiting the occurrence of bleeding or color unevenness even when recording is conducted at high speed like the one-pass bi-directional recording, and can achieve high image quality. Another object of the present invention is to provide an ink set, an image forming method and an image forming apparatus using such an aqueous ink.

The above objects can be achieved by the present invention described below. More specifically, an aqueous ink according to the present invention is an aqueous ink to be used together with a black ink containing a self-dispersion pigment, wherein the aqueous ink contains a reactive component for destabilizing the dispersion state of the self-dispersion pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

An ink set according to another embodiment of the present invention is an ink set comprising a plurality of inks, wherein the ink set comprises the above-described aqueous ink and the above-described black ink.

An image forming method according to a further embodiment of the present invention is an image forming method using a black ink containing a self-dispersion pigment and at least one aqueous ink to form an image, wherein the aqueous ink is the above-described aqueous ink, the black ink is the above-described black ink, and the image is formed in such a manner that an image formed with the black ink and an image formed with the aqueous ink overlap each other in at least a partial region.

An image forming apparatus according to a still further embodiment of the present invention is an image forming apparatus for forming an image by using a black ink containing a self-dispersion pigment and at least one aqueous ink, wherein the aqueous ink is the above-described aqueous ink, the black ink is the above-described black ink, and the apparatus comprises a unit for forming the image in such a manner that an image formed with the pigment ink and an image formed with the aqueous ink overlap each other in at least a partial region.

According to the present invention, there can be provided an aqueous ink that can provide images inhibiting the occurrence of bleeding or color unevenness even when recording is conducted at high speed like the one-pass bi-directional recording, and can achieve high image quality. According to another embodiment of the present invention, there can be provided an ink set, an image forming method and an image forming apparatus using such an aqueous ink.

Further features of the present invention will become apparent from the following description of exemplary embodiments with reference to the attached drawings.

DESCRIPTION OF THE EMBODIMENTS

Figure 1:
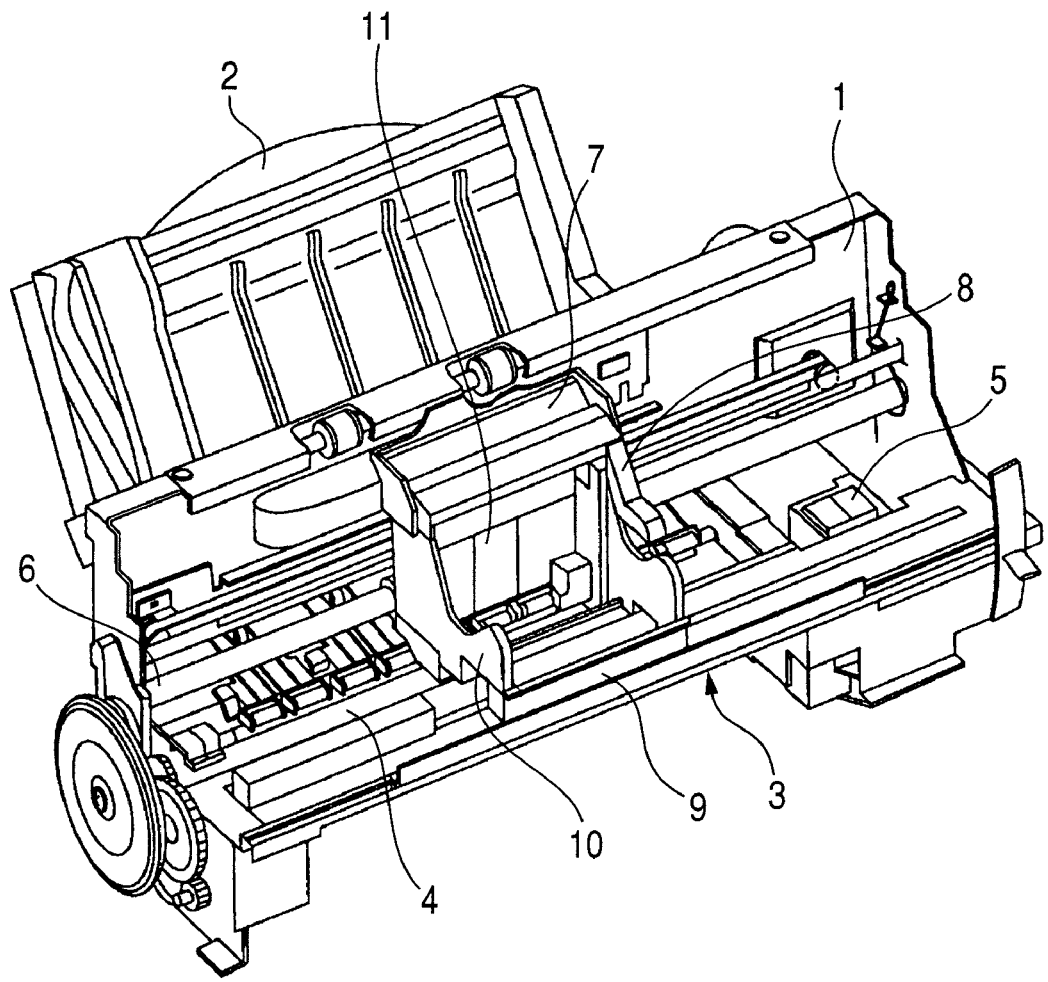
FIG. 1 schematically illustrates an exemplary ink jet recording apparatus.

The present invention will hereinafter be described in detail by preferred embodiments.

The aqueous ink according to the present invention is an aqueous ink to be used together with a black ink containing a self-dispersion pigment, the aqueous ink contains a reactive component for destabilizing the dispersion states of the self-dispersion pigment, the dynamic surface tension of the aqueous ink at a lifetime of 30 milliseconds is 41 mN/m or more, and the dynamic surface tension of the aqueous ink at a lifetime of 500 milliseconds is from 28 mN/m or more to 38 mN/m or less as determined by a maximum bubble pressure method.

Incidentally, the maximum bubble pressure method used in the measurement of the dynamic surface tension in the present invention is a method described below. Specifically, the maximum bubble pressure method is a method that a maximum pressure required to release a bubble formed at a tip portion of a probe (capillary) dipped in a liquid to be measured is measured, and a surface tension is found from this maximum pressure. The lifetime (surface age) means a time from a point of time a surface of a new bubble is formed after a bubble has been released from the tip portion to a point of time of a maximum bubble pressure (a point of time the curvature radius of the bubble becomes equal to the radius of the tip portion of the probe) upon the formation of the bubble at the tip portion of the probe in the maximum bubble pressure method. The dynamic surface tension in the present invention is a value measured at 25° C.

In the present invention, a black ink containing a self-dispersion pigment is called "a pigment black ink". The aqueous ink containing the reactive component for destabilizing the dispersion state of the self-dispersion pigment in the pigment black ink is called "a reactive ink". An ink containing no reactive component for destabilizing the dispersion state of the self-dispersion pigment in the pigment ink is called "a non-reactive ink". Incidentally, the reactive ink and non-reactive ink may be either color inks or black inks. However, color inks are particularly preferred in the present invention.

In the present invention, methods for applying the respective inks to a recording medium mainly include mainly the following two procedures. The reactive ink is first applied to at least a part of a region to which the pigment black ink will be applied, and the pigment black ink is then applied to at least a part of a region to which the reactive ink has been applied. Alternatively, the pigment black ink is first applied, and the reactive ink is then applied to at least a part of a region to which the pigment black ink has been applied. The above-described two methods may be combined with each other. In this case, no particular limitation is imposed on the order of applying the respective inks are applied to a recording medium.

At this time, application amounts of the respective inks are favorably such that the application amount of the reactive ink is from 2/100 to 50/100 with respect to the application amount of the pigment black ink. In other words, the application amount of the reactive ink is favorably from 2 or more to 50 or less when the amount of the pigment ink is 100. The reason why the application amounts of the respective inks favorably fall within the above respective ranges is as follows. If the application amount of the reactive ink is too small with respect to the application amount of the pigment black ink, the effect of the present invention may not be sufficiently achieved in some cases. If the application amount of the reactive ink is too great with respect to the application amount of the pigment black ink on the other hand, new blur may occur in some cases to lower image quality.

In the present invention, the occurrence of bleeding or color unevenness can be inhibited even when recording is conducted at high speed like the one-pass bi-directional recording. In other words, color unevenness caused by a difference in the order of applying the reactive ink and the pigment black ink can be reduced for inhibiting the occurrence of bleeding. The reason why such an effect is achieved is not clearly known. However, as a result of an investigation by the present inventors, the reason is considered to be attributable to the following mechanisms.

[Mechanism of Forming an Image when a Reactive Ink Having a Dynamic Surface Tension of 41 mN/m or More at a Lifetime of 30 Milliseconds is Used]

The significance of defining the dynamic surface tension of the reactive ink at a lifetime of 30 milliseconds will be first described below. The present inventors have carried out an investigation as to properties of reactive inks capable of solving the problems of the present invention using various pigment black inks and reactive inks as inks applicable to an ink jet recording method. Specifically, the present inventors have carried out an investigation with a view toward controlling the dynamic surface tension properties of inks at the lifetimes of 10 milliseconds and 1000 milliseconds, to which attention has heretofore been paid. However, it has been found that no effect can be achieved from the viewpoint of solving the problems of the present invention even when any conditions of the dynamic surface tension, to which attention has heretofore been paid, are employed.

Thus, the present inventors have carried out an investigation by assuming an ideal model as a condition an ink on a recording medium can take, reviewing the behavior of such minute droplets that the ejection volume per one ink droplet is, for example, 6 picoliters or less. As a result, the following fact has been found. More specifically, it has been found that a time difference upon contact of the pigment black ink and the reactive ink with each other on the recording medium is as extremely short as about 20 milliseconds to 50 milliseconds regardless of the construction of nozzles in a recording head and parameters such as an ejection frequency. Thus, the present inventors have carried out an investigation paying attention to this time difference. As a result, it has been found that the strongest correlation is shown between color unevenness in a recorded article and the dynamic surface tension of the reactive ink at a lifetime of 30 milliseconds, namely, such a dynamic surface tension is a dominant factor. The present inventors consider that the strong correlation between the dynamic surface tension value of the reactive ink at a lifetime of 30 milliseconds and the color unevenness implies the following fact. It is considered that the behavior of the reactive ink, including permeability into the recording medium, at a point of time 30 milliseconds have elapsed after the reactive ink was applied to the recording medium controls a balance of reactivity between the reactive ink and the pigment black ink. This balance of reactivity is considered to determine the color unevenness of an image formed by applying these inks one over the other.

The formation of an image using a reactive ink having the property of the dynamic surface tension at a lifetime of 30 milliseconds as defined in the present invention or a reactive ink not having this property in combination of a pigment black ink will be considered below. Incidentally, in the following consideration, it is assumed that the permeability of the pigment black ink into a recording medium is made relatively small for improving character quality. In other words, it is assumed that the (static) surface tensions of the pigment black ink and the color ink are made relatively great and small, respectively.

(1) Case where a reactive ink having a dynamic surface tension of 41 mN/m or more at a lifetime of 30 milliseconds and containing a reactive component and a pigment black ink are used:

(1-1) Case where the respective inks are applied in the order of the pigment black ink and the reactive ink so as to overlap each other:

When the pigment black ink is first applied to a recording medium, the pigment black ink covers the recording medium. At this time, the permeation of the pigment black ink into the recording medium is relatively slow, so that the self-dispersion pigment in the pigment black ink starts to aggregate on the surface of the recording medium. At this moment, the reactive ink is applied so as to overlap the pigment black ink. At this time, the pigment black ink having the property of slow permeation into the recording medium comes into contact with the reactive ink under liquid state on the surface of the recording medium. Therefore, the pigment black ink and the reactive ink are quickly mixed with each other at an interface between them to create a state of being liable to become uniform. Aggregation of a pigment is caused to rapidly and uniformly progress by the action of the reactive component in the reactive ink, so that the pigment comes to exist with a uniform distribution in the vicinity of the surface of the recording medium. As a result, uniformity of an image and an image density can be improved.

(1-2) Case where the respective inks are applied in the order of the reactive ink and the pigment black ink so as to overlap each other:

When the reactive ink is first applied to a recording medium, the reactive ink covers the recording medium. The pigment black ink is then applied so as to overlap the reactive ink. At this time, the reactive ink having a dynamic surface tension of 41 mN/m or more at a lifetime of 30 milliseconds does not immediately permeate into the recording medium because of its high surface tension and exists as a liquid state on the surface of the recording medium. In such a manner, the reactive ink comes into contact with the pigment black ink under liquid state on the surface of the recording medium. Therefore, the pigment black ink and the reactive ink are quickly mixed with each other at an interface between them to create a state of being liable to become uniform. Aggregation of a pigment is caused to rapidly and uniformly progress by the action of the reactive component in the reactive ink, so that the pigment comes to exist with a uniform distribution in the vicinity of the surface of the recording medium. As a result, uniformity of an image and an image density can be improved.

When recording is conducted at high speed like the one-pass bi-directional recording, recording of (1-1) and (1-2) is repeated. In such a manner, an image in which a region where the respective inks are applied in the order of the pigment black ink and the reactive ink so as to overlap each other and a region where the respective inks are applied in order of the reactive ink and the pigment black ink so as to overlap each other coexist, is formed. However, the uniformity of the image and the image density become excellent in both cases (1-1) and (1-2) by using the ink according to the present invention, so that the color unevenness caused by the bi-directional recording does not occur.

(2) Case where a reactive ink having a dynamic surface tension of less than 41 mN/m at a lifetime of 30 milliseconds and containing a reactive component and a pigment black ink are used:

(2-1) Case where the respective inks are applied in the order of the pigment black ink and the reactive ink so as to overlap each other:

The uniformity of an image and an image density can be improved by the same mechanism as the mechanism described in (1-1).

(2-2) Case where the respective inks are applied in the order of the reactive ink and the pigment black ink so as to overlap each other:

When the reactive ink is first applied to a recording medium, the reactive ink covers the recording medium. The pigment black ink is then applied so as to overlap the reactive ink. At this time, the reactive ink having a dynamic surface tension of less than 41 mN/m at a lifetime of 30 milliseconds starts to permeate into the recording medium because of its low surface tension before the pigment black ink is applied to the recording medium. Therefore, the proportion of the reactive ink and the pigment black ink which come into contact with each other under liquid state on the surface of the recording medium becomes relatively low to create a state of being liable to be unevenly mixed. Aggregation of the pigment by the action of the reactive component in the reactive ink is also caused to unevenly progress, so that the pigment comes to unevenly exist in the vicinity of the surface of the recording medium. At this time, a portion where the aggregated pigment exists thinly causes a feeling of whitish blank. As a result, the image becomes uneven, and the image density may not be sufficiently achieved in some cases.

When recording is conducted at high speed like the one-pass bi-directional recording, recording of (1-1) and (1-2) is repeated. In such a manner, an image in which a region where the respective inks are applied in the order of the pigment black ink and the reactive ink so as to overlap each other and a region where the respective inks are applied in the order of the reactive ink and the pigment black ink so as to overlap each other coexist is formed. Therefore, an even image and an uneven image are alternately formed in every recording pass, so that color unevenness occurs.

[Dynamic Surface Tension at a Lifetime of 500 Milliseconds]

As described above, it is necessary in the present invention that the reactive ink contains a reactive component for destabilizing the dispersion states of a self-dispersion pigment, and the dynamic surface tension of the reactive ink at a lifetime of 30 milliseconds by the maximum bubble pressure method is 41 mN/m or more. In addition, the reactive ink according to the present invention is required to have the property of dynamic surface tension at a lifetime of 500 milliseconds, which will be described below, for the purpose of improving the uniformity of a color solid image and inhibiting the ink from striking through a recording medium to a back surface thereof (strike through).

In order to improve the image quality of a full-color image when plain paper is used as recording medium, it is important that the uniformity in a color solid image is high. However, in particular, the wetting ability of the plain paper is often uneven, so that a coloring material in a color ink may not be caused to evenly exist on a recording medium in some cases when the plain paper is used as the recording medium. When an ink having such dynamic surface tension property as described above is a color ink having reactivity, the dynamic surface tension of the ink at a point of time 30 milliseconds have elapsed from the application of the ink to the recording medium is as high as 41 mN/m or more. Therefore, the permeation of the ink into the interior (thickness-wise direction of recording medium) of the recording medium is not caused to progress, so that the uniformity in a color solid image may not be achieved in some cases. Thus, the present inventors have carried out an investigation. As a result, it has been found that a reactive ink requires to have a dynamic surface tension of 38 mN/m or less at a lifetime of 500 milliseconds for the purpose of achieving excellent uniformity in the color solid image.

The significance of defining the dynamic surface tension of the reactive ink at a lifetime of 500 milliseconds will be described below. As a result of an investigation by the present inventors, it has been found that the strongest correlation is shown between the uniformity in the color solid image and the dynamic surface tension of the reactive ink at a lifetime of 500 milliseconds, namely, such a dynamic surface tension is a dominant factor. The present inventors consider that the strong correlation between the dynamic surface tension value of the reactive ink at a lifetime of 500 milliseconds and the uniformity in the color solid image implies the following fact. More specifically, the time required from the time the reactive ink is applied to a recording medium up to the time the fixing of a coloring material to the recording medium is completed while causing association or aggregation by the influence of evaporation of water in the ink is about several hundreds milliseconds to thousand milliseconds. At this time, the dynamic surface tension of the reactive ink at a lifetime of 500 milliseconds is considered to greatly affect the rate of fixing of the coloring material to the recording medium. A balance between the rate of fixing of the coloring material to the recording medium and aggregation of the coloring material is considered to determine the uniformity in the color solid image.

From the consideration described above, the reactive ink is easy to wet the recording medium when the dynamic surface tension of the reactive ink at a lifetime of 500 milliseconds is 38 mN/m or less, so that it is considered that the ink evenly permeates into the recording medium, and the coloring material evenly fixes to the recording medium. On the other hand, when the dynamic surface tension of the reactive ink at a lifetime of 500 milliseconds exceeds 38 mN/m, the reactive ink retains a state of being hard to wet the recording medium, so that it is considered that the coloring material causes uneven fixing on the recording medium.

If the dynamic surface tension of the reactive ink at a lifetime of 500 milliseconds is too low, specifically less than 28 mN/m, however, the permeability of such an ink into the recording medium becomes too great. As a result, in the case where plain paper is used as the recording medium in particular, the ink easily permeates into the interior of the recording medium (thickness-wise direction of the recording medium), so that the ink may strike through the back surface thereof, i.e., strike through may occur in some cases. The dynamic surface tension of the reactive ink at a lifetime of 500 milliseconds is thus required to be 28 mN/m or more.

[Upper Limit of Dynamic Surface Tension at a Lifetime of 30 Milliseconds]

If the dynamic surface tension of the reactive ink at a lifetime of 30 milliseconds is too high, specifically exceeds 51 mN/m, such an ink takes a long time to permeate into the recording medium. As a result, the ink spreads on the surface of the recording medium, so that the quality of characters formed with the reactive ink may be lowered in some cases. Therefore, the dynamic surface tension of the reactive ink at a lifetime of 30 milliseconds is favorably 51 mN/m or less.

<Ink>

With respect to the respective inks according to the present invention, the features of the inks and respective components making up the inks will hereinafter be described.

[Reactive Ink]

The reactive ink requires to contain a reactive component for destabilizing the dispersion states of a self-dispersion pigment in a pigment black ink and have the following dynamic surface tension properties. The reactive ink requires to have a dynamic surface tension of 41 mN/m or more at a lifetime of 30 milliseconds and a dynamic surface tension of from 28 mN/m or more to 38 mN/m or less at a lifetime of 500 milliseconds. As described above, the dynamic surface tension of the reactive ink at a lifetime of 30 milliseconds is favorably 51 mN/m or less.

In the present invention, the destabilization of the self-dispersion pigment in the pigment black ink is defined as satisfying the following mode (1) or (2). A mixed ink is first prepared by mixing a reactive ink and a pigment black ink at equal volumes. At this time, the destabilization is defined as satisfying (1) a mode that aggregation or precipitation of the self-dispersion pigment in the mixed ink occurs or (2) a mode that the viscosity C of the mixed ink satisfies the following relationship: C>((A+B)/2)×1.2, wherein A is the viscosity of the reactive ink, and B is the viscosity of the pigment black ink. Incidentally, the viscosity is a value measured at ordinary temperature (25° C.), and the unit thereof is mPa·s. Specifically, the mode (1) or (2) may be, for example, the following mode (A), (B), (C) or (D).

Mode (A): The self-dispersion pigment in the pigment black ink has an anionic group, and the reactive ink contains a cationic component as the reactive component. In this case, when the pigment black ink and the reactive ink are mixed, the cationic component in the reactive ink reacts with the anionic group of the self-dispersion pigment in the pigment black ink to destabilize the dispersion state of the pigment, so that aggregation or precipitation of the pigment occurs or the viscosity of the mixed ink increases.

As the cationic component, may be used, for example, a polyvalent metal. Specific ways for containing the polyvalent metal in the ink include, for example, to contain a polyvalent metal salt in the ink. Incidentally, the polyvalent metal salt exists as a polyvalent metal ion and an anion in the ink. In the present invention, however, this case is represented as containing the polyvalent metal in the ink. Specific favorable examples of the polyvalent metal ion include $Mg^{2+}$, $Ca^{2+}$, $Cu^{2+}$, $Co^{2+}$, $Ni^{2+}$, $Fe^{2+}$, $La^{3+}$, $Nd^{3+}$, $Y^{3+}$ and $Al^{3+}$. Specific examples of the anion include inorganic acid ions such as $NO_3^-$, $SO_4^{2-}$ and $Cl^-$, and organic acid ions such as $CH_3COO^-$. In the present invention, $Mg^{2+}$ among the above-mentioned polyvalent metal ions is particularly favorably used from the viewpoints of storage stability of the resulting reactive ink and of the requirement that members (for example, an ink flow path making up an ink jet recording apparatus), with which the reactive ink comes into contact, are not dissolved. $NO_3^-$, $SO_4^{2-}$, $Cl^-$ and $CH_3COO^-$ among the above-mentioned anions are favorably used from the viewpoint of solubility, and $NO_3^-$, $SO_4^{2-}$ and $CH_3COO^-$ are particularly favorably used because such anions are excellent in solubility in water. The content (% by mass) of the polyvalent metal in the reactive ink is favorably from 0.01% by mass or more to 10.0% by mass or less based on the total mass of the ink. When contained in the form of the polyvalent metal salt, the content (% by mass) of the polyvalent metal salt in the reactive ink is favorably from 0.1% by mass or more to 20.0% by mass or less, more favorably from 0.2% by mass or more to 15.0% by mass or less based on the total mass of the ink.

Mode (B): The self-dispersion pigment in the pigment black ink has a cationic group, and the reactive ink contains an anionic component as the reactive component. In this case, when the pigment black ink and the reactive ink are mixed, the anionic component in the reactive ink reacts with the cationic group of the self-dispersion pigment to destabilize the dispersion state of the pigment, so that aggregation or precipitation of the pigment occurs, or the viscosity of the mixed ink increases.

Mode (C): The self-dispersion pigment in the pigment black ink is stably dispersed at a pH of from 3 to 7, and the pH of the reactive ink is controlled to 8 to 11. In this case, when the pigment black ink and the reactive ink are mixed, the pH of the pigment black ink is raised to destabilize the dispersion state of the pigment, so that aggregation or precipitation of the pigment occurs, or the viscosity of the mixed ink increases.

Mode (D): The self-dispersion pigment in the pigment black ink is stably dispersed at a pH of from 7 to 11, and the pH of the reactive ink is controlled to 3 to 6. In this case, when the pigment black ink and the reactive ink are mixed, the pH of the pigment black ink is lowered to destabilize the dispersion state of the pigment, so that aggregation or precipitation of the pigment occurs, or the viscosity of the mixed ink increases.

(Coloring Material)

The effects of the present invention can be achieved even when the reactive ink is either an ink containing no coloring material or an ink containing a coloring material. In the case of the reactive ink containing the coloring material, the coloring material in the reactive ink may be suitably selected from either publicly known coloring materials or newly synthesized coloring materials. The content (% by mass) of the coloring material in the reactive ink is favorably from 0.05% by mass or more to 15.0% by mass or less based on the total mass of the ink.

Coloring materials usable in the reactive ink are mentioned by color tones below. Needless to say, the present invention is not limited to these coloring materials.

(Yellow Coloring Material)

C.I. Direct Yellow: 8, 11, 12, 27, 28, 33, 39, 44, 50, 58, 85, 86, 87, 88, 89, 98, 100, 110, 132 and 173; and C.I. Acid Yellow: 1, 3, 7, 11, 17, 23, 25, 29, 36, 38, 40, 42, 44, 76, 98 and 99.

(Cyan Coloring Material)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229 and 230; C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265 and 289; C.I. Food Red: 87, 92 and 94; and C.I. Direct Violet: 107.

(Cyan Coloring Material)

C.I. Direct Blue: 1, 15, 22, 25, 41, 76, 77, 80, 86, 90, 98, 106, 108, 120, 158, 163, 168, 199, 226 and 307; and C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221 and 244.

(Black Coloring Material)

C.I. Direct Black: 17, 19, 22, 31, 32, 51, 62, 71, 74, 112, 113, 154, 168 and 195; C.I. Acid Black: 2, 48, 51, 52, 110, 115 and 156; and C.I. Food Black: 1 and 2.

(Other Coloring Materials)

In the present invention, the so-called special color inks of red, green and blue may be used together with the inks of the above-mentioned color tones as needed. Specific examples of coloring material usable in these inks are mentioned below. Needless to say, the present invention is not limited to these coloring materials.

C.I. Acid. Orange: 7, 8, 10, 12, 24, 33, 56, 67, 74, 88, 94, 116 and 142; C.I. Acid Red: 111, 114, 266 and 374; C.I. Direct Orange: 26, 29, 34, 39, 57, 102 and 118; C.I. Food Orange: 3; C.I. Reactive Orange: 1, 4, 5, 7, 12, 13, 14, 15, 16, 20, 29, 30, 84 and 107; C.I. Disperse Orange: 1, 3, 11, 13, 20, 25, 29, 30, 31, 32, 47, 55 and 56; C.I. Acid Green: 1, 3, 5, 6, 9, 12, 15, 16, 19, 21, 25, 28, 81 and 84; C.I. Direct Green: 26, 59 and 67; C.I. Food Green: 3; C.I. Reactive Green: 5, 6, 12, 19 and 21; C.I. Disperse Green: 6 and 9; C.I. Acid Blue: 62, 80, 83, 90, 104, 112, 113, 142, 203, 204, 221 and 244; C.I. Reactive Blue: 49; C.I. Acid Violet: 17, 19, 48, 49, 54 and 129; C.I. Direct Violet: 9, 35, 47, 51, 66, 93, 95 and 99; C.I.

Reactive Violet: 1, 2, 4, 5, 6, 8, 9, 22, 34 and 36; and C.I. Disperse Violet: 1, 4, 8, 23, 26, 28, 31, 33, 35, 38, 48 and 56.

(Surfactant)

The reactive ink favorably contains a surfactant as a penetrant. The prepared ink requires to be adjusted so as to have the above-described change in dynamic surface tension. As such a surfactant, may be used, for example, the following surfactants. The surfactants mentioned below may be used either singly or in any combination thereof.

(Nonionic Surfactant)

Polyoxyethylene alkyl ethers, polyoxyethylene fatty acid esters, polyoxyethylene alkyl phenyl ethers, polyoxyethylene/polyoxypropylene block copolymers, fatty acid diethanolamides and acetylene glycol compounds.

(Anionic Surfactant)

Polyoxyethylene alkyl ether sulfate salts, polyoxyethylene alkyl ether sulfonates, polyoxyethylene alkyl phenyl ether sulfate salts, polyoxyethylene alkyl phenyl ether sulfonates, alpha-sulfo-fatty acid ester salts, alkylbenzene sulfonates, alkylphenolsulfonic acid salts, alkylnaphthalenesulfonic acid salts, alkyltetralinsulfonic acid salts and dialkylsulfo-succinic acid salts.

(Cationic Surfactant)

Alkyltrimethylammonium salts and dialkyldimethyl-ammonium chlorides.

(Amphoteric Surfactant)

Alkylcarboxybetaines.

(Other Surfactants)

Fluorine-containing surfactants and silicone surfactants.

In the present invention, the reactive ink requires to be adjusted so as to have the above-described dynamic surface tension properties. To adjust the reactive ink so as to have the above-described dynamic surface tension properties can be achieved by using one or more of the surfactants mentioned above to adjust the dynamic surface tension of the ink.

In the present invention, it is particularly favorable to adjust the dynamic surface tension of the reactive ink using a nonionic surfactant, favorably a polyoxyethylene alkyl ether, among the above-mentioned surfactants. In the case where such a surfactant is used, the content (% by mass) of the surfactant in the reactive ink is favorably from 0.10% by mass or more to 3.0% by mass or less, more favorably from 0.5% by mass or more to 2.0% by mass or less based on the total mass of the ink. If the content is less than 0.10% by mass, wetting of a member making up an ink flow path of an ink jet recording apparatus is not sufficiently achieved, so that ejection stability may be lowered in some cases. If the content exceeds 3.0% by mass, the content of the surfactant becomes too high when water in such an ink evaporates in the vicinity of an ejection orifice of the ink jet recording apparatus, so that the viscosity of the ink may locally increase in some cases to lower the ejection stability of the ink.

In the present invention, the polyoxyethylene alkyl ether is particularly favorably at least one selected from surfactants represented by the following general formula (1) and surfactants represented by the following general formula (2). An ink containing these surfactants causes a large change of dynamic surface tension with change of the lifetime, so that such an ink is particularly preferred for achieving both inhibition of bleeding or color unevenness and high image quality.

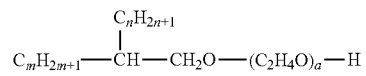

General formula (1)

In the general formula (1), a, m and n each independently represent an integer of 1 or more, and m+n represents an integer of from 14 to 20.

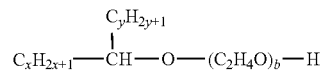

General formula (2)

In the general formula (2), b, x and y each independently represent an integer of 1 or more, and x+y represents an integer of from 12 to 21.

When a surfactant represented by the general formula (1) or the general formula (2) is used, the content (% by mass) of the surfactant is favorably from 0.30% by mass or more to 2.0% by mass or less, more favorably from 0.75% by mass or more to 1.5% by mass or less based on the total mass of the ink. The content is controlled within the above range, whereby inhibition of bleeding or color unevenness and high image quality can be simultaneously achieved, and excellent ejection stability can be achieved.

In the present invention, the HLB value of the surfactant as determined by the Griffin method is particularly favorably from 12.0 or more to 16.5 or less. The Griffin method is a method for calculating an HLB value according to the following equation (1) based on a formula weight of a hydrophilic group and a molecular weight of a surfactant.

$$HLB = 20 \times (\text{formula weight of the hydrophilic group of surfactant})/(\text{molecular weight of surfactant}) \quad (1).$$

If the HLB value is less than 12.0, a state where such a surfactant has been dissolved in an ink may not be retained in some cases when the ink is stored because of its too low hydrophilicity. If the HLB value is more than 16.5 on the other hand, it may be difficult in some cases to lower the dynamic surface tension of the resulting ink at a lifetime of 500 milliseconds because the hydrophilicity of such a surfactant is too high.

(Aqueous Medium)

The reactive ink favorably contains an aqueous medium that is a mixed solvent of water and a water-soluble organic compound. Any water-soluble organic compound may be used in the inks according to the present invention so far as the inks are adjusted so as to have the above-described dynamic surface tension properties. The content (% by mass) of the water-soluble organic compound in the ink is favorably from 1.0% by mass or more to 50.0% by mass or less, more favorably from 3.0% by mass or more to 40.0% by mass or less based on the total mass of the ink.

As the water-soluble organic compound, may be specifically used, for example, the following compounds:
alcohols having 1 to 6 carbon atoms, such as ethanol, isopropanol, 2-propanol, n-butanol, isobutanol, pentanol and hexanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such as tetrahydrofuran and dioxane; alkylene glycols such as ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as glycerol, 1,3-butanediol, 1,2- or 1,5-pentanediol, 1,2- or 1,6-hexanediol, 2-methyl-1,3-propanediol and 1,2,6-hexanetriol; alkyl ethers of polyhydric alcohols, such as ethylene glycol monomethyl (or ethyl)ether, diethylene glycol monomethyl (or ethyl)ether and triethylene glycol monoethyl (or butyl)ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide and thiodiglycol.

As water, is favorably used deionized water (ion-exchanged water). The content (% by mass) of water in the reactive ink is favorably from 50.0% by mass or more to 95.0% by mass or less based on the total mass of the ink for the purpose of providing the ink as an ink having a viscosity proper for being stably ejected and inhibited from clogging at an orifice.

(Other Components)

In addition to the above-described components, the reactive ink may contain a moisture-retaining compound such as urea, a urea derivative, trimethylolpropane or trimethylolethane for the purpose of maintaining the moisture retention of the ink. The content (% by mass) of the moisture-retaining compound in the reactive ink is favorably from 0.1% by mass or more to 20% by mass or less, more preferably from 3.0% by mass or more to 10.0% by mass or less based on the total mass of the ink. In addition to the above-described components, the reactive ink may contain various compounds, as needed for the purpose of providing the reactive ink with desired physical property values. Specifically, for example, various additives such as a pH adjustor, a rust preventive, a preservative, a mildewproofing agent, an antioxidant, an antireducing agent, an evaporation accelerator, a chelating agent and a water-soluble polymer may be contained.

(Physical Properties of Ink)

In the present invention, the static surface tension of the reactive ink is favorably from 20 mN/m or more to 40 mN/m or less, more favorably from 25 mN/m or more to 35 mN/m or less.

[Pigment Black Ink]

(Coloring Material)

In the present invention, a pigment used in the pigment black ink requires to be a self-dispersion pigment. In the present invention, the self-dispersion pigment is a pigment, to the surfaces of which at least one hydrophilic group is bonded directly or through another atomic group. The pigment will be described in detail subsequently. The pigment black ink containing the self-dispersion pigment is used together with the above-described reactive ink, whereby images having high-level image quality, which has been required in recent years, i.e., images in which the occurrence of bleeding or color unevenness is effectively inhibited, can be provided. The present inventors consider a reason for this to be as follows. The pigment black ink containing the self-dispersion pigment causes aggregation of the pigment faster compared with any other pigment, for example, a resin dispersion pigment when brought into contact with the reactive ink, so that the above-described effect can be more markedly achieved.

The self-dispersion pigment used in the pigment black ink in the present invention is particularly favorably self-dispersion carbon black. Incidentally, in the pigment black ink, such a dye as mentioned as the coloring material for the reactive ink may also be used in addition to the self-dispersion pigment for purposes of color adjustment. The content (% by mass) of the self-dispersion pigment in the pigment black ink is favorably from 0.1% by mass or more to 15.0% by mass or less, more favorably 1.0% by mass or more to 10.0% by mass or less based on the total mass of the ink.

(Carbon Black)

As the pigment used in the pigment black ink, is mentioned carbon black. Examples of usable carbon black include furnace black, lamp black, acetylene black and channel black. Specifically, for example, the following commercially available carbon black products may be used. These pigments may be used either singly or in any combination thereof. Needless to say, the present invention is not limited to these products.

Raven: 7000, 5750, 5250, 5000 ULTRA, 3500, 2000, 1500, 1250, 1200, 1190 ULTRA-II, 1170 and 1255 (all, products of Columbian Carbon Co.); Black Pearls L, Regal: 400R, 300R and 660R, Mogul L, Monarch: 700, 800, 880, 900, 1000, 1100, 1300, 1400 and 2000, and Valcan XC-72R (all, products of CABOT CO.); Color Black: FW1, FW2, FW2V, FW18, FW200, S150, S160 and S170, Printex: 35, U, V, 140U and 140V, and Special Black: 6, 5, 4A and 4 (all, products of Degussa AG); and No. 25, No. 33, No. 40, No. 47, No. 52, No. 900, No. 2300, MCF-88, MA600, MA7, MA8 and MA100 (all, products of MITSUBISHI CHEMICAL CORPORATION).

Carbon black newly prepared for the present invention may also be used. Further, magnetic fine particles such as magnetite and ferrite, and titanium black may also be used without being limited to carbon black.

(Self-dispersion Pigment)

In the present invention, a self-dispersion pigment, to the surfaces of particles of which at least one hydrophilic group is bonded directly or through another atomic group (—R—), may be used as the above-described carbon black (hereinafter may also referred to as a pigment). Such a self-dispersion pigment is used, whereby there is no need to add a dispersant for dispersing a pigment in an aqueous medium constituting an ink. Of course, a polymer dispersant can be used together with the self-dispersion pigment, if necessary.

Specific examples of the hydrophilic group bonded to the surfaces of the pigment particles include —COO($M_1$), —$SO_3$($M_1$), —$PO_3$H($M_1$), —$PO_3$($M_1$)$_2$ and —(COO($M_1$))$_n$. In the above formulae, "$M_1$" is a hydrogen atom, alkali metal, ammonium or organic ammonium, and n is an integer of 2 or more. Said another atomic group (—R—) may be an alkylene group having 1 to 12 carbon atoms, a substituted or unsubstituted phenylene group or a substituted or unsubstituted naphthylene group. Needless to say, the present invention is not limited to these groups. The form of the hydrophilic group in the ink may be any form in a state where a part thereof is dissociated or in a state where all thereof is dissociated. In the present invention, a pigment which is obtained by a diazo coupling method and to the surfaces of particles of which a compound having the structure of —R—(COO$M_1$)$_n$ group in its part is bonded may be particularly favorably used.

For —R— bonded to the surfaces of the pigment particles, a carbon bond adjacent to the carbon atom to which —(COO$M_1$) is bonded favorably bonds —(COO$M_1$). It is also favorable that n is 2, and R is $C_6H_3$. Incidentally, the condition that in —R— bonded to the surfaces of the pigment particles, the carbon bond adjacent to the carbon atom to which —(COO$M_1$) is bonded bonds —(COO$M_1$) means that all of two or more carbon atoms adjacent to each other in R have a —(COO$M_1$) group. Specifically, this means having such a structure as represented by the following general formula (3). In the present invention, a self-dispersion pigment to the surfaces of the particles of which the group represented by the following general formula (3) is bonded is favorably used.

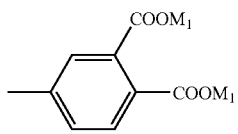

General formula (3)

For the pigment black ink, the —R—(COOM$_1$)$_n$ group is favorably bonded at a higher density to the surfaces of the pigment particles. Specifically, the hydrophilic group density in the surfaces of the pigment particles is favorably, for example, 2.00 μmol/m$^2$ or more. Incidentally, in the present invention, the hydrophilic group density in the pigment particles is greatly affected by the specific surface area of the pigment and the structure of a functional group bonded to the surfaces of the pigment particles, so that the hydrophilic group density is not limited to this range. The upper limit of the hydrophilic group density in the surfaces of the pigment particles is favorably 4.0 μmol/m$^2$ or less.

In the pigment black ink, M$_1$ is particularly favorably ammonium because more excellent water fastness is achieved. This is considered to be attributable to the condition that when such an ink is applied to a recording medium, this ammonium is decomposed to evaporate ammonia, and the hydrophilic group bonded to the surfaces of the pigment particles becomes an H type (acid type) to lower hydrophilicity. A self-dispersion pigment in which M$_1$ is ammonium can be obtained according to the following process. For example, a self-dispersion pigment in which M$_1$ is an alkali metal is subjected to ion exchange to replace M$_1$ by ammonium. Alternatively, an acid is added to obtain the H type, and ammonium hydroxide is then added to convert M$_1$ to ammonium.

(Salt)

The pigment black ink favorably contains a salt, whereby aggregation of the pigment on a recording medium is accelerated, so that the effect of the present invention can be stably achieved irrespective of the kind of the recording medium.

The form of the salt in the pigment black ink may be any form in a state where a part thereof is dissociated or in a state where all thereof is dissociated. Incidentally, the salt exists as a metal ion and an anion in the ink. In the present invention, however, this case is represented as containing the salt in the ink.

Specific examples of salts usable in the pigment black ink include (M$_2$)NO$_3$, CH$_3$COO(M$_2$), C$_6$H$_5$COO(M$_2$), C$_2$H$_4$(COO(M$_2$))$_2$, C$_6$H$_4$(COO(M$_2$))$_2$ and (M$_2$)$_2$SO$_4$. "M$_2$" in the formulae is a hydrogen atom, alkali metal, ammonium or organic ammonium. Examples of the alkali metal include lithium, sodium and potassium. Examples of the organic ammonium include acetamido, benzamido, methylamino, butylamino, diethylamino and phenylamino. Needless to say, the present invention is not limited thereto.

The content of the salt in the pigment black ink is only required to be contained within a range capable of sufficiently achieving the effect of the present invention. Specifically, the content (% by mass) of the salt is favorably from 0.05% by mass or more to 10.0% by mass or less based on the total mass of the ink. If the content is less than 0.05% by mass, the effect of the present invention may not be achieved in some cases. If the content exceeds 10.0% by mass, the storage stability of the resulting ink may be deteriorated in some cases.

(Aqueous Medium)

The pigment black ink favorably contains an aqueous medium that is a mixed solvent of water and a water-soluble organic compound. As water, is favorably used deionized water (ion-exchanged water). The content (% by mass) of water in the pigment black ink is favorably from 50.0% by mass or more to 95.0% by mass or less based on the total mass of the ink.

The water-soluble organic compound is particularly favorably a compound having an effect of inhibiting drying of the ink. The content (% by mass) of the water-soluble organic compound in the pigment black ink is favorably from 3.0% by mass or more to 50.0% by mass or less based on the total mass of the ink. For example, the following water-soluble organic compounds may be specifically used. The following water-soluble organic compounds may be use either singly or in any combination thereof.

Alcohols having 1 to 6 carbon atoms, such as ethanol, isopropanol, 2-propanol, n-butanol, isobutanol, butanol, pentanol and hexanol; carboxylic acid amides such as N,N-dimethylformamide and N,N-dimethylacetamide; ketones or keto-alcohols such as acetone, methyl ethyl ketone and 2-methyl-2-hydroxypentan-4-on; cyclic ethers such as tetrahydrofuran and dioxane; polyhydric alcohols such as glycerol, ethylene glycol, diethylene glycol, triethylene glycol, tetraethylene glycol, 1,2- or 1,3-propylene glycol, 1,2- or 1,4-butylene glycol and polyethylene glycol; polyhydric alcohols such as 1,3-butanediol, 1,2- or 1,5-pentanediol, 1,2- or 1,6-hexanediol, dithioglycol, 2-methyl-1,3-propanediol, 1,2,6-hexanetriol and trimethylolpropane; alkyl ethers of polyhydric alcohols, such as ethylene glycol monomethyl (or ethyl)ether, diethylene glycol monomethyl (or ethyl)ether and triethylene glycol monoethyl (or butyl)ether; heterocyclic compounds such as 2-pyrrolidone, N-methyl-2-pyrrolidone, 1,3-dimethyl-2-imidazolidinone and N-methylmorpholine; and sulfur-containing compounds such as dimethyl sulfoxide.

(Other Components)

In addition to the above-described components, the pigment black ink may contain a moisture-retaining compound such as urea, a urea derivative, trimethylolpropane or trimethylolethane for the purpose of maintaining the moisture retention of the ink. The content (% by mass) of the moisture-retaining compound in the pigment black ink is favorably from 0.1% by mass or more to 20.0% by mass or less, more preferably from 3.0% by mass or more to 10.0% by mass or less based on the total mass of the ink. In addition to the above-described components, the pigment black ink may contain additives such as a surfactant, a pH adjustor, an antifoaming agent, a rust preventive, a preservative, a mildewproofing agent, an antioxidant, an anti-reducing agent, an evaporation accelerator and a chelating agent as needed for the purpose of providing the pigment black ink with desired physical property values.

(Physical Properties of Ink)

In the present invention, the static surface tension of the pigment black ink is favorably from 30 mN/m or more to 60 mN/m or less, more favorably from 35 mN/m or more to 50 mN/m or less.

[Non-reactive Ink]

In the present invention, a further ink may be used in combination in addition to the above-described reactive ink and pigment black ink. The further ink in the present invention includes an ink (non-reactive ink) which does not contain, for example, a polyvalent metal, i.e., does not react with the pigment black ink. A coloring material for the non-reactive ink may be suitably selected for use from publicly known coloring materials and newly synthesized coloring materials. Specifically, those usable as the coloring materials for the reactive inks may be used. The content (% by mass) of the coloring material in the non-reactive ink is favorably from 0.05% by mass or more to 15.0% by mass or less based on the total mass of the ink. As an aqueous medium and additives of the non-reactive ink, may be used the same medium and additives as in the above-described reactive ink and pigment ink.

<Ink Set>

The ink set according to the present invention has a plurality of inks, wherein the ink set has the above-described aqueous ink and pigment black ink. The ink set may further have at least one of the non-reactive inks described above and any other ink. The ink set in the present invention includes that in the form of an ink cartridge independently storing a plurality of inks or in the form of an ink cartridge integrally formed by combining a plurality of ink storage portions respectively storing a plurality of inks. Incidentally, the ink cartridge may have such a construction that a recording head is additionally integrally formed. The form where the ink cartridge independently storing the plurality of inks is constructed so as to be installed detachably in an ink jet recording apparatus may also be included in the ink set according to the present invention. In any event, it is only necessary for the ink set according to the present invention to be made up in such a manner that at least the reactive ink and the pigment black ink can be used in combination, and so the ink set is not limited to the above-described modes and may be any mode.

<Image Forming Method and Image Forming Apparatus>

The image forming method according to the present invention is an image forming method for forming an image using a black ink containing a self-dispersion pigment and at least one aqueous ink, wherein the above-described pigment black ink and the above-described aqueous ink are used as the black ink and the aqueous ink, and the image is formed in such a manner that an image formed with the pigment black ink and an image formed with the aqueous ink overlap each other in at least a partial region.

The image forming apparatus according to the present invention is an image forming apparatus for forming an image by using a black ink containing a self-dispersion pigment and at least one aqueous ink, wherein the above-described pigment black ink and the above-described aqueous ink are used as the black ink and the aqueous ink, and the apparatus has a unit for forming the image in such a manner that an image formed with the pigment black ink and an image formed with the aqueous ink overlap each other in at least a partial region.

As an image forming apparatus suitable for use in conducting recording using the above-described reactive ink and pigment black ink, an ink jet recording apparatus capable of conducting bi-directional recording will be described with reference to FIG. 1 and FIG. 2.

FIG. 1 schematically illustrates an exemplary ink jet recording apparatus. A chassis 1 is made up of a plurality of plate-like metal members having a predetermined rigidity and forms a skeleton of the ink jet recording apparatus. Into the chassis, are incorporated a feed section 2 for feeding a recording medium, a conveyance section 4 for guiding the recording medium to a predetermined recording position and to a discharge section 3, a recording section for conducting predetermined recording on the recording medium, and a recording head recovery section 5 for conducting a recovery operation for the recording section. The recording section has a carriage 7 supported scannably along a carriage shaft 6, a recording head cartridge 10 detachably mounted on the carriage 7 through a recording head setting lever 8, and a carriage cover 9 for positioning this cartridge to a predetermined position. One end portion of a contact flexible print cable (hereinafter abbreviated as "contact FPC") 11 is connected to another engaging portion of the carriage 7 opposite to the recording head cartridge 10. A contact portion 15 (see FIG. 2) formed on the end portion of the contact FPC 11 comes into electrical contact with a contact portion 15, which is an external signal input terminal provided on the recording head cartridge 10, to conduct transfer of various information and power supply to the recording head cartridge 10.

Upon formation of an image, the carriage 7 arranges the recording head cartridge 10, into which a recording head has been incorporated, at an intended image forming position, to conduct recording on a recording medium by ejecting an ink from the recording head based on the various information received through the contact part 15. Detailedly, a main scan that the carriage 7 is scanned in a row direction along the carriage shaft 6 while conducting recording by the recording head, and a secondary scan that the conveyance section 4 conveys the recording medium in a line direction are alternately repeated, thereby forming the image on the recording medium. At this time, an image forming method that an image is formed by one main scan of the recording head in a unit region of a recording medium is one-pass recording, and an image forming method that this one-pass recording is conducted in both directions of a forward direction and a backward direction of the main scan is one-pass bi-directional recording. An image forming method that an image is formed on the unit region of the recording medium by n scans of the recording head is n-pass recording (n is 1 or more). The unit region means one pixel or one band, and the unit region can be preset as various regions as needed. Here, one pixel means one pixel corresponding to resolution, and one band means a region of an image formed by one scan of the recording head. It is particularly favorable from the viewpoint of achieving the effects of the present invention that the image forming method and image forming apparatus are constituted so as to include the one-pass bi-directional recording.

Figure 2:
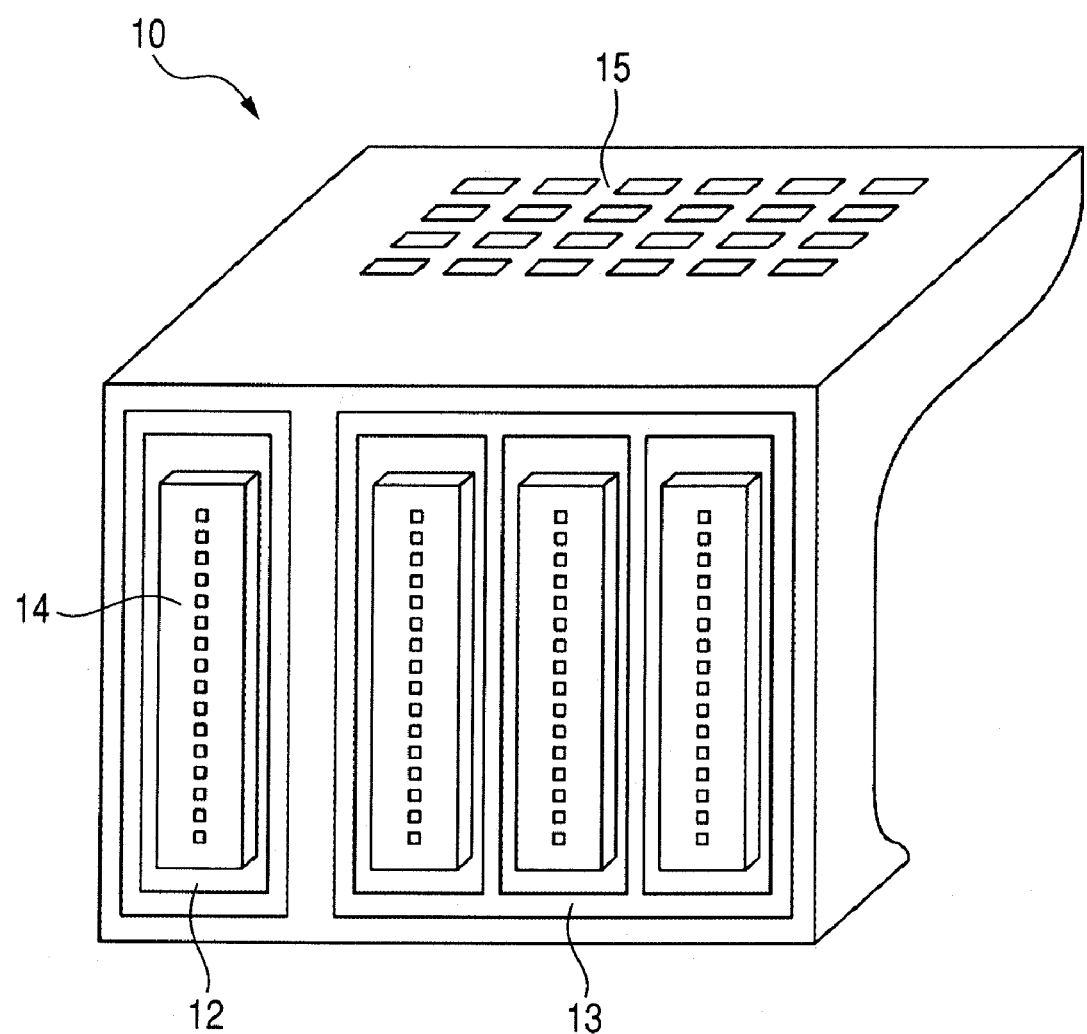
FIG. 2 schematically illustrates an exemplary recording head cartridge.

FIG. 2 schematically illustrates an exemplary recording head cartridge 10. Here, description is given taking, as an example, the case where three color inks and a pigment black ink are used. At least one of the three color inks is the reactive ink according to the present invention. The recording head cartridge 10 ejects the inks from a row 14 of ejection orifices in a recording head 12 for pigment black ink and rows of ejection orifices set likewise in a recording head 13 for color inks based on recording signals received from the recording apparatus body through the contact portion 15. Incidentally, although the three color inks have been described above, the number of color inks is not limited thereto, and the number of inks and the hues of the inks may be suitably preset so far as at least one of the color inks is the reactive ink according to the present invention.

As the recording head, is mentioned a recording head of a Bubble-Jet (trademark) system that film boiling is caused in an ink by the action of thermal energy to eject the ink. With respect to the typical construction and principle of this head, those using the basic principle disclosed in, for example, U.S. Pat. Nos. 4,723,129 and 4,740,796 are preferred. This system may be applied to any of the so-called On-Demand type and continuous type. However, the On-Demand type is effective because at least one driving signal, which corresponds to recording information and gives a rapid temperature rise exceeding film boiling, is applied to an electrothermal converter, thereby generating thermal energy to cause film boiling on the heat-acting surface of a recording head, so that a bubble can be formed in the ink in response to the driving signal in relation of one to one. The ink is ejected through an ejection orifice by the growth-contraction of this bubble. When this driving signal is applied in the form of a pulse, the growth-contraction of the bubble is suitably conducted in a moment, so that the ejection of the ink, which is excellent in responsiveness in particular, can be achieved. It is thus more favorable to use such pulsed signals.

A recording head of a system that an ink is ejected by the action of mechanical energy is mentioned in addition to the above-described recording head. The recording head of this system is equipped with a nozzle-forming substrate having a plurality of nozzles, piezoelectric materials provided in an opposing relation to the nozzles, pressure-generating devices composed of an electric conductive material and an ink filled around the pressure-generating devices. In this construction, the pressure-generating devices are displaced by application of a voltage to eject the ink.

The ink jet recording apparatus may be either an apparatus that a recording head and an ink cartridge are separately provided or an apparatus that these members are unseparably integrally formed. The ink cartridge may be either a type mounted on a carriage separably from a recording head or unseparably and integrally with the recording head, or a type provided at a fixing site of the ink jet recording apparatus and feeding an ink to a recording head through an ink feeding member such as a tube. When a structure for applying a favorable negative pressure to a recording head is provided in an ink cartridge, the following structure may favorably be used. More specifically, examples thereof include a structure that an absorbing member is arranged in an ink storage portion of the ink cartridge, and a structure having a flexible ink-storing bag and a spring part for applying biasing force to the bag in a direction expanding the internal volume of the bag. The ink jet recording apparatus favorably uses a recording system of such serial type as described above, but may use a line printer type that recording elements are arranged over a range corresponding to the overall width of a recording medium.

EXAMPLES

The present invention will hereinafter be described more specifically by the following Examples, Comparative Examples and Reference Example. However, the present invention is not limited to these examples unless going beyond the gist of the present invention.

Incidentally, "%" as will be used below is based on mass unless expressly noted.

<Preparation of Pigment Dispersion Solution>

To a solution with 5 g of concentrated hydrochloric acid dissolved in 5.5 g of water, was added 1.5 g of 4-amino-1,2-benzenedicarboxylic acid under cooling at 5° C. A container, in which this solution was contained, was then placed in an ice bath, and the solution was stirred, whereby the solution always remained at 10° C. or lower, and then to this solution a solution with 1.8 g of sodium nitrite dissolved in 9 g of water of 5° C. was added. After this solution was stirred for additional 15 minutes, 6 g of carbon black having a specific surface area of 220 $m^2/g$ and a DBP oil absorption of 105 mL/100 g was added under stirring. Thereafter, the resultant mixture was stirred for additional 15 minutes. After the resultant slurry was filtered through filter paper (trade name: Standard Filter Paper No. 2; product of Advantec Co.), the resultant particles were fully washed with water and dried in an oven controlled to 110° C., thereby preparing self-dispersion carbon black. The resultant self-dispersion carbon black was subjected to ion exchange to replace the sodium ion by the ammonium ion. Water was further added to the self-dispersion carbon black obtained above to disperse the carbon black so as to give a pigment concentration of 10% by mass, thereby preparing a dispersion solution. A pigment dispersion solution in which the self-dispersion carbon black into the surfaces of particles of which —$C_6H_3$—$(COONH_4)_2$ group had been introduced was dispersed in water was obtained according to the above-described process.

The ionic group density of the self-dispersion carbon black prepared above was measured. As a result, the ionic group density was 3.1 $\mu mol/m^2$. The measuring method for the ionic group density used at this time was such that the sodium ion concentration in the self-dispersion carbon black (sodium salt type) prepared above was measured by means of an ion meter (manufactured by TOA DKK) to convert this value into an ionic group density of the self-dispersion carbon black.

<HLB Value and Structure of Surfactant>

The HLB values of surfactants were determined. Specifically, the HLB value of the main component in the respective surfactants were calculated according to the Griffin method (the following equation (1)). The results are shown in Table 1.

$$HLB = 20 \times (\text{formula weight of the hydrophilic group of surfactant})/(\text{molecular weight of surfactant}) \qquad (1).$$

In Table 1, the structure of the main component in each surfactant, and m, n, a and m+n values when the structure of such a surfactant corresponds to the general formula (1), or x, y, b and x+y values when the structure of such a surfactant corresponds to the general formula (2) are shown collectively.

In Table 1, EMALEX 1610, EMALEX 1615 and EMALEX 1825 are all surfactants produced by Nihon Emulsion Co., Ltd. NIKKOL BT-7 and NIKKOL BT-12 are both surfactants produced by Nikko Chemicals Co., Ltd. ACETYLENOL E100 is a surfactant produced by Kawaken Fine Chemicals Co., Ltd.

TABLE 1

|  | HLB value | Structure of surfactant | General formula (1) | | | | General formula (2) | | | |
| --- | --- | --- | --- | --- | --- | --- | --- | --- | --- | --- |
|  |  |  | m | n | a | m + n | x | y | b | x + y |
| EMALEX 1610 | 12.9 | Polyoxyethylene isocetyl ether | 8 | 6 | 10 | 14 | — | — | — | — |
| EMALEX 1615 | 14.7 | Polyoxyethylene isocetyl ether | 8 | 6 | 15 | 14 | — | — | — | — |
| EMALEX 1825 | 16.1 | Polyoxyethylene isostearyl ether | 9 | 7 | 25 | 16 | — | — | — | — |
| NIKKOL BT-7 | 12.2 | Polyoxyethylene sec-tridecyl ether | — | — | — | — | 6 | 6 | 7 | 12 |
| NIKKOL BT-12 | 14.5 | Polyoxyethylene sec-tridecyl ether | — | — | — | — | 6 | 6 | 12 | 12 |
| ACETYLENOL E-100 | 13.3 | Acetylene glycol ethylene oxide adduct | — | — | — | — | — | — | — | — |

<Preparation of Inks>

After the components shown in Tables 2 to 5 were mixed and sufficiently stirred, the resultant respective mixtures were filtered under pressure through a microfilter (product of Fuji Photo Film Co., Ltd.) having a pore size of 3.0 μm for pigment black inks and a microfilter (product of Fuji Photo Film Co., Ltd.) having a pore size of 0.2 μm for the other inks, thereby preparing inks. Incidentally, in Tables 2 to 5, EMALEX 1610, EMALEX 1615 and EMALEX 1825 are all surfactants produced by Nihon Emulsion Co., Ltd. NIKKOL BT-7 and NIKKOL BT-12 are both surfactants produced by Nikko Chemicals Co., Ltd. ACETYLENOL E100 is a surfactant produced by Kawaken Fine Chemicals Co., Ltd.

TABLE 2

(Unit: %)

|  | Pigment black ink | |
|---|---|---|
|  | BK-1 | BK-2 |
| Pigment dispersion solution | 35.00 | 35.00 |
| Glycerol | 8.00 | 8.00 |
| Diethylene glycol | 4.00 | 4.00 |
| 2-Pyrrolidone | 5.00 | 5.00 |
| Trimethylolpropane | 4.00 | 4.00 |
| ACETYLENOL E100 | 0.14 | 0.14 |
| Ammonium sulfate | 0.33 |  |
| Pure water | 43.53 | 43.86 |

TABLE 3

(Unit: %)

|  | Reactive ink | | | | | | | |
|---|---|---|---|---|---|---|---|---|
|  | R-1 | R-2 | R-3 | R-4 | R-5 | R-6 | R-7 | R-8 |
| C.I. Direct Blue 199 | 5.5 | 5.5 | 5.5 | 5.5 | 5.5 | 6.0 | 5.5 | 5.5 |
| C.I. Acid Red 289 |  |  |  |  |  |  |  |  |
| C.I. Acid Yellow 23 |  |  |  |  |  |  |  |  |
| Glycerol | 5.0 | 5.0 | 5.0 | 5.0 | 5.0 | 10.0 | 5.0 | 5.0 |
| 1,5-Pentanediol | 10.0 | 10.0 | 10.0 | 10.0 | 10.0 | 5.0 | 10.0 | 10.0 |
| Diethylene glycol | 5.0 | 5.0 | 5.0 | 5.0 | 5.0 | 5.0 | 5.0 | 5.0 |
| 1,2-Hexanediol |  |  |  |  |  | 1.3 |  |  |
| EMALEX 1610 | 1.0 | 0.6 |  |  |  |  |  |  |
| EMALEX 1615 |  |  | 1.0 | 0.7 | 0.2 |  |  |  |
| EMALEX 1825 |  |  |  |  |  | 1.0 |  |  |
| NIKKOL BT-7 |  |  |  |  |  |  | 1.0 |  |
| NIKKOL BT-12 |  |  |  |  |  |  |  | 0.8 |
| ACETYLENOL E100 |  |  |  |  |  |  |  |  |
| Magnesium nitrate | 2.5 | 2.5 | 2.5 | 2.5 | 2.5 | 2.5 | 2.5 | 2.5 |
| Magnesium sulfate |  |  |  |  |  |  |  |  |
| Pure water | 71.0 | 71.4 | 71.0 | 71.3 | 71.8 | 69.2 | 71.0 | 71.2 |

TABLE 4

(Unit: %)

|  | Reactive ink | | | | | | | |
|---|---|---|---|---|---|---|---|---|
|  | R-9 | R-10 | R-11 | R-12 | R-13 | R-14 | R-15 | R-16 |
| C.I. Direct Blue 199 | 5.5 |  |  |  | 5.5 | 5.5 | 5.5 | 5.5 |
| C.I. Acid Red 289 |  | 3.0 |  |  |  |  |  |  |
| C.I. Acid Yellow 23 |  |  | 3.0 |  |  |  |  |  |
| Glycerol | 5.0 | 5.0 | 5.0 | 5.0 | 5.0 | 5.0 | 5.0 |  |
| 1,5-Pentanediol | 10.0 | 10.0 | 10.0 | 10.0 | 10.0 | 10.0 | 10.0 | 10.0 |
| Diethylene glycol | 5.0 | 5.0 | 5.0 | 5.0 | 5.0 | 5.0 | 5.0 |  |
| 1,2-Hexanediol |  |  |  |  |  |  |  | 10.0 |
| EMALEX 1610 |  | 0.6 | 0.6 | 0.6 |  |  | 1.0 |  |
| EMALEX 1615 |  |  |  |  |  |  |  |  |
| EMALEX 1825 |  |  |  |  |  |  |  |  |
| NIKKOL BT-7 |  |  |  |  |  |  |  | 1.0 |
| NIKKOL BT-12 | 0.2 |  |  |  |  |  |  |  |
| ACETYLENOL E100 |  |  |  |  | 1.0 | 0.2 |  |  |
| Magnesium nitrate | 2.5 | 2.5 | 2.5 | 2.5 | 2.5 | 2.5 |  | 2.5 |
| Magnesium sulfate |  |  |  |  |  |  | 2.5 |  |
| Pure water | 71.4 | 73.9 | 73.9 | 76.9 | 71.0 | 71.8 | 71.0 | 71.0 |

TABLE 5

| (Unit: %) | Non-reactive ink | |
|---|---|---|
|  | NR-1 | NR-2 |
| C.I. Direct Blue 199 | 5.5 | 5.5 |
| Glycerol | 5.0 | 5.0 |
| 1,5-Pentanediol | 10.0 | 10.0 |
| Diethylene glycol | 5.0 | 5.0 |
| ACETYLENOL E100 | 1.0 |  |
| EMALEX 1610 |  | 1.0 |
| Pure water | 73.5 | 73.5 |

<Reactivity Between Reactive Ink or Non-Reactive Ink and Pigment Black Ink>

Twenty grams of the pigment black ink and 20 g of the reactive ink or the non-reactive ink shown in Table 6 were mixed and sufficiently stirred to prepare a mixed ink, and the mixed ink was then left at rest for 24 hours. Thereafter, the presence of precipitate and/or aggregate in the mixed ink was visually observed to make evaluation as to reactivity. The evaluation results are shown in Table 6.

TABLE 6

|  |  | Black ink | The other ink[*1] | Presence of precipitate or aggregate |
|---|---|---|---|---|
| No. of mixed ink | 1 | BK-1 | R-1 | Observed |
|  | 2 | BK-1 | R-2 | Observed |
|  | 3 | BK-1 | R-3 | Observed |
|  | 4 | BK-1 | R-4 | Observed |
|  | 5 | BK-1 | R-5 | Observed |
|  | 6 | BK-1 | R-6 | Observed |
|  | 7 | BK-1 | R-7 | Observed |
|  | 8 | BK-1 | R-8 | Observed |
|  | 9 | BK-1 | R-9 | Observed |
|  | 10 | BK-1 | R-10 | Observed |
|  | 11 | BK-1 | R-11 | Observed |
|  | 12 | BK-1 | R-12 | Observed |
|  | 13 | BK-1 | R-13 | Observed |
|  | 14 | BK-1 | R-14 | Observed |
|  | 15 | BK-1 | R-15 | Observed |
|  | 16 | BK-1 | R-16 | Observed |
|  | 17 | BK-2 | R-1 | Observed |
|  | 18 | BK-2 | R-3 | Observed |
|  | 19 | BK-2 | R-9 | Observed |
|  | 20 | BK-2 | R-13 | Observed |
|  | 21 | BK-1 | NR-1 | Not observed |
|  | 22 | BK-1 | NR-2 | Not observed |

[*1]Reactive ink or non-reactive ink.

From Table 6, it is understood that in the combination of the pigment black ink with the reactive ink, the reactive inks R-1 to R-16 are inks destabilizing the dispersion state of the pigment in the pigment black ink.

<Evaluation>

(Measurement of Dynamic Surface Tension)

With respect to the respective reactive inks and non-reactive inks obtained above, the dynamic surface tensions of the inks at (1) a lifetime of 30 milliseconds and (2) a lifetime of 500 milliseconds were measured. An apparatus (Bubble Pressure Tesiometer BP2; manufactured by KRUSS) that measures a dynamic surface tension according to the maximum bubble pressure method was used in the measurement. The evaluation results as to the dynamic surface tension are shown in Table 7.

TABLE 7

| Reactive ink or Non-reactive ink | Dynamic surface tension [mN/m] | |
|---|---|---|
|  | (1) Lifetime of 30 ms | (2) Lifetime of 500 ms |
| R-1 | 49 | 34 |
| R-2 | 52 | 34 |
| R-3 | 49 | 34 |
| R-4 | 51 | 35 |
| R-5 | 56 | 39 |
| R-6 | 46 | 38 |
| R-7 | 40 | 31 |
| R-8 | 41 | 36 |
| R-9 | 42 | 36 |
| R-10 | 48 | 33 |
| R-11 | 49 | 32 |
| R-12 | 52 | 33 |
| R-13 | 36 | 33 |
| R-14 | 47 | 42 |
| R-15 | 49 | 34 |
| R-16 | 36 | 27 |
| NR-1 | 36 | 33 |
| NR-2 | 49 | 36 |

(Color Unevenness in Black Solid Image)

The first application inks and second application inks shown in Table 8 were used in combination to form a black solid image by an image forming method that another ink is applied so as to overlap a region to be applied with a pigment black ink. An apparatus obtained by modifying an ink jet recording apparatus BJF850 (manufactured by Canon Inc.) capable of conducting bi-directional recording was used as an image forming apparatus. Four kinds of plain papers of Canon Extra, Canon Office Multi-Function Applications, EN100 and high-color development plain paper Superwhite Paper SW101 (all, products of Canon Inc.) were used as recording media. Incidentally, the inks were applied to each recording medium so as to overlap each other in the order of the first application ink and the second application ink as described in Table 8. The formation of the image was conducted by the one-pass bi-directional recording. The application amounts of the inks per 1/600 square inches at this time were controlled to about 28 ng for the pigment black ink and about 4.5 ng for the other ink.

With respect to the respective images obtained by using the four kinds of recording media, differences in image density and color tone between an image formed by forward recording and an image formed by backward recording were visually observed to make evaluation, thereby regarding an average value thereof as an evaluation result of color unevenness in the black solid image. The evaluation of the color unevenness in Examples 1 to 14 Comparative Examples 1 to 7 and Reference Example 1 was relatively made at 5 ranks of A, B, C, D and E. More specifically, the color unevenness was ranked as A where the condition of differences in image density and color tone between the image formed by the forward recording and the image formed by the backward recording was best and E where the condition of differences in image density and color tone between the image formed by the forward recording and the image formed by the backward recording was worst. As a result of the evaluation, A and B among the 5 ranks of A, B, C, D and E were determined to be an allowable level of the color unevenness in the black solid image, which is currently required. The evaluation results are shown in Table 8.

(Bleeding Resistance)

An image in which the same black solid image as that formed in the evaluation of the black solid image adjoins a solid image formed with a color ink was formed. At this time, the components shown below were mixed and sufficiently stirred, the resultant respective mixtures were filtered under pressure through a microfilter (product of Fuji Photo Film Co., Ltd.) having a pore size of 0.2 μm, thereby preparing a yellow non-reactive ink and this ink was used as the color ink. The components constituting the yellow ink were C.I. Acid Yellow 23: 3.0 parts, glycerol: 5.0 parts, 1,5-pentanediol: 10.0 parts, diethylene glycol: 5.0 parts, Acetylenol E100: 1.0 part and water: 76.0 parts. An apparatus obtained by modifying an ink jet recording apparatus BJF850 (manufactured by Canon Inc.) capable of conducting bi-directional recording was used as an image forming apparatus. Four kinds of plain papers of Canon Extra, Canon Office Multi-Function Applications, EN100 and high-color development plain paper Superwhite Paper SW101 (all, products of Canon Inc.) were used as recording media. The formation of the image was conducted by the one-pass bi-directional recording. The application amounts of the inks per 1/600 square inches at this time were controlled to about 28 ng for the pigment black ink and about 4.5 ng for the non-reactive ink.

With respect to the respective images obtained by using the four kinds of recording media, bleeding at a boundary portion between the black and color images was visually observed to make evaluation, thereby regarding an average value thereof as an evaluation result of bleeding. The evaluation of the bleeding resistance in Examples 1 to 14 and Comparative Examples 1 to 7 and Reference Example 1 was relatively made with three ranks of A, B and C. More specifically, the bleeding resistance was ranked as A where bleeding was least and the image quality was good, and C where bleeding was most and the image quality was poor. As a result of the evaluation, A and B among the 3 ranks of A, B and C were determined to be an allowable level of the bleeding resistance, which is currently required. The evaluation results are shown in Table 8.

(Uniformity of Color Solid Image)

Color solid images were formed by using the inks shown on a right-hand side in Table 8. At this time, no pigment black ink was used. An apparatus obtained by modifying an ink jet recording apparatus BJF850 (manufactured by Canon Inc.) capable of conducting bi-directional recording was used as an image forming apparatus. Four kinds of plain papers of Canon Extra, Canon Office Multi-Function Applications, EN100 and high-color development plain paper Superwhite Paper SW101 (all, products of Canon Inc.) were used as recording media. The formation of the image was conducted by the one-pass bi-directional recording. The application amount of the ink per 1/600 square inches at this time was controlled to about 14 ng.

With respect to the respective images obtained by using the four kinds of recording media, the uniformity of the color solid images was visually observed to make evaluation, thereby regarding an average value thereof as an evaluation result of uniformity in the color solid image. The evaluation of the uniformity in the color solid image of Examples 1 to 14 and Comparative Examples 1 to 7 and Reference Example 1 was relatively made with four ranks of A, B, C and D. More specifically, the uniformity in the color solid image was ranked as A where the uniformity in the color solid image was highest and the image quality was good, and D where the uniformity in the color solid image was lowest. As a result of the evaluation, A and B among the 4 ranks of A, B, C and D were determined to be an allowable level of the uniformity in the color solid image, which is currently required. The evaluation results are shown in Table 8.

(Color Character Quality)

Color characters of the Gothic type were formed in 12 points by using the inks shown on a right-hand side in Table 8. At this time, no pigment black ink was used. An apparatus obtained by modifying an ink jet recording apparatus BJF850 (manufactured by Canon Inc.) capable of conducting bi-directional recording was used as an image forming apparatus. Four kinds of plain papers of Canon Extra, Canon Office Multi-Function Applications, EN100 and high-color development plain paper Superwhite Paper SW101 (all, products of Canon Inc.) were used as recording media. The formation of the image was conducted by the one-pass bi-directional recording. The application amount of the ink per 1/600 square inches at this time was controlled to about 18 ng.

With respect to the respective images obtained by using the four kinds of recording media, the color character quality was visually observed to make evaluation, thereby regarding an average value thereof as an evaluation result of the color character quality. The evaluation of the color character quality in Examples 1 to 14 and Comparative Examples 1 to 7 and Reference Example 1 was relatively made with two ranks of A and B. More specifically, the color character quality was ranked as A where the color character quality was best, and B where the color character quality was poorer than A but was at an allowable level.

The evaluation results are shown in Table 8.

TABLE 8

|  |  | Recording direction | First appl. ink | Second appl. ink | Color Unevenness of black | Bleeding resistance | Ink | *1 | *2 |
|---|---|---|---|---|---|---|---|---|---|
| Ex. | 1 | Forward | R-1 | BK-1 | A | A | R-1 | A | A |
|  |  | Backward | BK-1 | R-1 |  |  |  |  |  |
|  | 2 | Forward | R-2 | BK-1 | A | A | R-2 | A | B |
|  |  | Backward | BK-1 | R-2 |  |  |  |  |  |
|  | 3 | Forward | R-3 | BK-1 | A | A | R-3 | A | A |
|  |  | Backward | BK-1 | R-3 |  |  |  |  |  |
|  | 4 | Forward | R-4 | BK-1 | A | A | R-4 | B | A |
|  |  | Backward | BK-1 | R-4 |  |  |  |  |  |
|  | 5 | Forward | R-6 | BK-1 | A | A | R-6 | B | A |
|  |  | Backward | BK-1 | R-6 |  |  |  |  |  |
|  | 6 | Forward | R-8 | BK-1 | B | A | R-8 | B | A |
|  |  | Backward | BK-1 | R-8 |  |  |  |  |  |
|  | 7 | Forward | R-9 | BK-1 | A | A | R-9 | B | A |
|  |  | Backward | BK-1 | R-9 |  |  |  |  |  |
|  | 8 | Forward | R-10 | BK-1 | A | A | R-10 | A | A |
|  |  | Backward | BK-1 | R-10 |  |  |  |  |  |
|  | 9 | Forward | R-11 | BK-1 | A | A | R-11 | A | A |
|  |  | Backward | BK-1 | R-11 |  |  |  |  |  |

TABLE 8-continued

|  |  | Recording direction | First appl. ink | Second appl. ink | Color Unevenness of black | Bleeding resistance | Ink | *1 | *2 |
|---|---|---|---|---|---|---|---|---|---|
|  | 10 | Forward | R-12 | BK-1 | A | A | R-12 | — | — |
|  |  | Backward | BK-1 | R-12 |  |  |  |  |  |
|  | 11 | Forward | R-15 | BK-1 | A | A | R-15 | A | A |
|  |  | Backward | BK-1 | R-15 |  |  |  |  |  |
|  | 12 | Forward | R-3 | BK-2 | A | B | R-3 | A | A |
|  |  | Backward | BK-2 | R-3 |  |  |  |  |  |
|  | 13 | Forward | R-1 | BK-2 | A | B | R-1 | A | A |
|  |  | Backward | BK-2 | R-1 |  |  |  |  |  |
|  | 14 | Forward | R-9 | BK-2 | B | B | R-9 | B | A |
|  |  | Backward | BK-2 | R-9 |  |  |  |  |  |
| Comp Ex. | 1 | Forward | R-13 | BK-1 | C | A | R-13 | A | A |
|  |  | Backward | BK-1 | R-13 |  |  |  |  |  |
|  | 2 | Forward | R-13 | BK-2 | D | B | R-13 | A | A |
|  |  | Backward | BK-2 | R-13 |  |  |  |  |  |
|  | 3 | Forward | NR-1 | BK-1 | D | C | NR-1 | A | A |
|  |  | Backward | BK-1 | NR-1 |  |  |  |  |  |
|  | 4 | Forward | R-14 | BK-1 | A | A | R-14 | D | A |
|  |  | Backward | BK-1 | R-14 |  |  |  |  |  |
|  | 5 | Forward | R-7 | BK-1 | C | A | R-7 | A | A |
|  |  | Backward | BK-1 | R-7 |  |  |  |  |  |
|  | 6 | Forward | R-5 | BK-1 | A | A | R-5 | C | B |
|  |  | Backward | BK-1 | R-5 |  |  |  |  |  |
|  | 7 | Forward | R-16 | BK-1 | C | A | R-16 | A | A |
|  |  | Backward | BK-1 | R-16 |  |  |  |  |  |
| Ref. Ex. | 1 | Forward | NR-2 | BK-1 | C | C | NR-2 | A | A |
|  |  | Backward | BK-1 | NR-2 |  |  |  |  |  |

*1: Uniformity in color image;
*2: Color character quality.

When the portions of the color images formed on the recording media using the reactive ink (R-16) of Comparative Example 7 were visually observed from the their back surfaces, it was found that strike through occurred. On the other hand, no strike through occurred on back surfaces of the portions of the color images formed on the recording media using the reactive inks other than the reactive ink (R-16) or using the non-reactive inks.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-126629, filed May 11, 2007, and Japanese Patent Application No. 2008-112755, filed Apr. 23, 2008, which are hereby incorporated by reference herein in their entirety.

What is claimed is:

1. An aqueous ink to be used together with a black ink comprising a self-dispersion pigment, the aqueous ink comprising:
  a reactive component for destabilizing a dispersion state of the self-dispersion pigment; and
  a polyoxyethylene alkyl ether as a surfactant,
  wherein a dynamic surface tension, at 25° C., of the aqueous ink at a lifetime of 30 milliseconds is 41 mN/m or more and a dynamic surface tension, at 25° C., of the aqueous ink at a lifetime of 500 milliseconds is from 28 mN/m or more to 38 mN/m or less as determined by a maximum bubble pressure method, and wherein the content (% by mass) of the surfactant in the aqueous ink is from 0.10% by mass or more to 3.0% by mass or less based on the total mass of the ink.

2. The aqueous ink according to claim 1, wherein the dynamic surface tension of the aqueous ink at a lifetime of 30 milliseconds determined by the maximum bubble pressure method is 51 mN/m or less.

3. The aqueous ink according to claim 1, wherein the polyoxyethylene alkyl ether is at least one selected from surfactants represented by the following general formula (1) and surfactants represented by the following general formula (2)

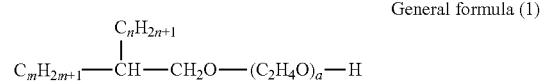

General formula (1)

wherein a, m and n each independently represent an integer of 1 or more, and m+n represents an integer of from 14 to 20:

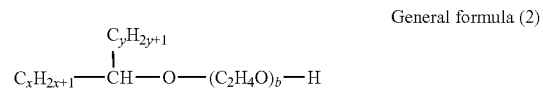

General formula (2)

wherein b, x and y each independently represent an integer of 1 or more, and x +y represents an integer of from 12 to 21.

4. The aqueous ink according to claim 1, wherein the reactive component is a polyvalent metal.

5. An ink set comprising a plurality of inks, wherein the ink set comprises the aqueous ink according to claim 1 and the black ink according to claim 1.

6. An image forming method using a black ink comprising a self-dispersion pigment and at least one aqueous ink to form an image,
  wherein the aqueous ink being the aqueous ink according to claim 1, the black ink being the black ink according to claim 1, the method comprising forming an image in such a manner that an image formed with the black ink and an image formed with the aqueous ink overlap each other in at least a partial region.

7. An image forming apparatus for forming an image by using a black ink comprising a self-dispersion pigment and at least one aqueous ink,
wherein the aqueous ink being the aqueous ink according to claim 1, the black ink being the black ink according to claim 1,
the apparatus comprising a unit for forming the image in such a manner that an image formed with the pigment ink and an image formed with the aqueous ink overlap each other in at least a partial region.

8. The aqueous ink according to claim 1, wherein the HLB value of the surfactant as determined by the Griffin method is from 12.0 or more to 16.5 or less.

* * * * *